United States Patent Office 3,597,321
Patented Aug. 3, 1971

3,597,321
DIAGNOSTIC COMPOSITION FOR THE DIFFERENTIATION OF STAPHYLOCOCCI
Donald Paul Kronish, Rockaway, and Metka Prevorsek, Morristown, N.J., assignors to Warner-Lambert Pharmaceutical Company, Morris Plains, N.J.
No Drawing. Filed Apr. 17, 1969, Ser. No. 817,188
Int. Cl. C12k 1/06
U.S. Cl. 195—103.5    16 Claims

ABSTRACT OF THE DISCLOSURE

A diagnostic composition, and its use in the differentiation of staphylococci, is described. The composition comprises the combination of a bibulous material to which there has been applied two separate diagnostic agents, one of which detects mannitol fermentation and the other of which detects coagulase production. The agent which detects mannitol fermentation is a composition comprising (1) a nutrient capable of supporting the growth of microorganisms, or a combination of such nutrients, (2) D-mannitol, (3) a chemical indicator which changes color as mannitol is fermented to acid degradation products and, optionally, (4) sodium chloride and/or a thickener. The agent which detects coagulase production is a suitable coagulable material which is substantially free of glucose.

The diagnostic agents can be applied to the bibulous material as two separate zones, each zone preferably being separated by a zone of an inert, hydrophobic barrier. In the alternative, the bibulous material can be impregnated with the agent which detects mannitol fermentation, following which the agent which detects coagulase production can be superimposed thereon.

Growing organisms suspended in saline and incubated in contact with the diagnostic composition can be differentiated in a period of from about 4 to about 6 hours.

BRIEF DESCRIPTION OF THE INVENTION

The present invention provides a diagnostic composition which permits the rapid and positive differentiation of staphylococci. Additionally, the invention provides a method for using the composition.

In carrying out the invention, a bibulous material is treated with (1) a diagnostic agent which is capable of detecting mannitol fermentation and (2) with a diagnostic agent which is capable of detecting coagulase production. The composition which is used to detect mannitol fermentation comprises (1) a nutrient of the type conventionally used in growing microorganisms or a combination of such nutrients (2) D-mannitol (3) a chemical indicator which, by a color change, shows the fermentation of D-mannitol to acid degradation products and, optionally, (4) sodium chloride and/or a suitable thickening agent. The latter is used, where needed, to provide a composition the viscosity of which is best suited for application to the bibulous material. The composition which, in the practice of the present invention, is used to detect coagulase production is a suitable coagulable material which is free, or substantially free, of glucose.

BACKGROUND OF THE INVENTION

Differentiation between staphylococci is an important responsibility in clinical microbiology. Two of the most widely used tests for identifying staphylococci are the coagulase producton test and the mannitol fermentation test. Most strains isolated from human lesions are coagulase-positive and mannitol-positive, i.e. S. aureus. The latter is pathogenic. Coagulase-negative and mannitol-negative staphylococci, i.e. S. epidermidis, are most frequently considered to be parasitic rather than pathogenic. Positive reactions to both the coagulase production and mannitol fermentation tests are an indication of the pathogenicity of the staphylococci. Negative reactions to both tests indicate that the isolate has less clinical significance. However, since some intermediate forms are also found and may be clinically significant, it is important that clinical laboratories perform both the coagulase production and mannitol fermentation tests.

The ability of pathogenic staphylococci to produce coagulase, an enzyme capable of clotting plasma, has been reported. Numerous investigators have attempted to utilize this finding as a means for determining the pathogenicity of unknown organisms. Classical tests for coagulase production are performed routinely by the so-called "tube" method which measures free coagulase production or by the so-called "slide" technique which measures bound coagulase either on or in the cell wall of the organism. The tube method and the slide technique are described in the publications J. Bact. 41:431–440 (1941) and Medical Microbiology, R. Cruickshank, pages 137–138, published by Williams and Wilkins Company, 11th edition, 1965, respectively. In these tests, both rabbit plasma and human plasma have been used as the substrate.

Mannitol Salt Agar is used as a selective medium for the isolation of pathogenic staphylococci. This medium is described in J. Bact. 50:201–203 (1945). Due to the presence of 7.5% sodium chloride therein, growth of most bacteria, other than staphylococci, is inhibited on this medium. When the medium is inoculated with a material containing staphylococci and incubated for a period of 36 hours at a temperature of 37° C., mannitol-fermenting staphylococci grow luxuriantly, surrounded by yellow zones. In contrast, mannitol-non fermenting staphylococci produce small colonies, surrounded by red or purple zones. Positive identification of an unknown specimen as pathogenic can require as long as five days when conventional coagulase production and mannitol fermentation tests are employed.

A solid growth medium which is suitable for the visual identification of pathogenic staphylococci from initial cultures is described in the publication Am. J. Clin. Path. 32:192–194 (August 1959). Some measure of success has been achieved using this medium. However, it has been found that other bacteria which produce coagulase, for example, Escherichia coli, grow on this medium.

Accordingly, while some advances have been made in the development of reagents and procedures for the differentiation of staphylococci, there is not now commercially available an easily transportable, storage stable diagnostic reagent for the simultaneous detection of coagulase production and mannitol fermentation which does not require the preparation of test reagents by clinical laboratory personnel.

DETAILED DESCRIPTION

The diagnostic composition of this invention comprises a suitable bibulous material to which there has been applied a diagnostic agent which detects the fermentation of mannitol and a diagnostic agent which detects the production of coagulase. In general, any bibulous material which is conventionally used in producing diagnostic compositions can be employed in the practice of this invention. As used herein, the term "bibulous" denotes a material which is able to retain a liquid by capillary action. Included among the bibulous materials which can be, and are, employed in the practice of this invention, are filter paper, felt, porous ceramic strips, woven or matted glass fiber, etc. It is to be understood, however, that the invention is not restricted to the use of the aforementioned materials. It will be obvious that other similar materials can be employed. In the preferred embodiment of the invention, filter paper, particularly the grade marketed commercially as Eaton Dikeman No. 623 filter paper (70 pounds), is employed.

As indicated heretofore, the diagnostic agent which is used herein to detect the fermentation of mannitol contains (1) a nutrient capable of supporting the growth of microorganisms or a combination of such nutrients, (2) D-mannitol, (3) a chemical indicator which changes color when, and if, mannitol is converted to acid degradation products by fermentation and, optionally, (4) sodium chloride and/or a thickening agent.

In general, any nutrient, or combination of nutrients conventionally used in the growing of microorganisms can be employed in the production of this diagnostic agent. Such nutrients include, for example, yeast extract, tryptone, the proteose peptones, tryptose, etc. In the preferred embodiment of the invention, a combination of beef extract and proteose peptone No. 3 is used as the nutrient source. Such a combination is described in the Difco Manual, 9th Edition, (1953) Difco Laboratories, Inc., Detroit, Mich.

Throughout the specification and in the claims, D-mannitol is disclosed as a component of the composition for detecting the fermentation of mannitol. It will be understood, however, that one could use D,L-mannitol, if desired, in lieu of D-mannitol. Hence, as used herein, the term "D-mannitol" should be construed as embracing D,L-mannitol also. In the preferred embodiment of the invention, D-mannitol rather than D,L-mannitol is employed.

In general, any chemical indicator which, by an appropriate color change, shows the conversion of mannitol into acid-containing degradation products, can be employed. Thus, for example, Phenol Red, Brom Thymol Blue, Brom Cresol Purple, etc. can be used. In the preferred embodiment of the invention, however, Phenol Red is the indicator employed.

Although sodium chloride is an optional ingredient in the composition for detecting the fermentation of mannitol, it is used in producing the preferred product of the invention.

The diagnostic agent for detecting mannitol fermentation contains, as an optional ingredient, a thickening agent. The thickener is employed, where needed, to provide an agent having a viscosity best suited for application to the bibulous material. Numerous thickening agents are fully suited for use. In general, any thickening agent, which will not interfere with the class of enzyme, i.e. staphylocoagulase, which is responsible for the bound coagulase reaction and which will not interfere with the enzymes responsible for the fermentation of mannitol, can be employed. However, particularly well suited for use are, for example, a dextran having a molecular weight within the range of from about 60,000 to about 90,000, higher molecular weight polyethylene glycols, carboxy methyl cellulose, etc. In the preferred embodiment of the invention, a dextran is employed.

In producing the above described composition, the nutrient, or combination of nutrients, D-mannitol, the chemical indicator and sodium chloride, if used, are dissolved in distilled water. Thereafter, the thickening agent is added to the solution, as and if needed, to bring it to desired viscosity. Additional distilled water can, thereafter, be added to provide a solution having the components in the desired concentration and which has a viscosity within acceptable limits.

Although the quantities of the various components used in producing the diagnostic reagent which detects mannitol fermentation, are to some extent critical, they are variable within certain prescribed limits. Thus, for example, for each 100 ml. of solution, the ingredients will be present in the following ranges:

Nutrient material or materials __ From about 5.5 grams to about 17 grams.
D-mannitol or D,L-mannitol ____ From about 5.0 grams to about 30.0 grams.
Sodium chloride _____ From about 0 gram to about 10.0 grams.
Chemical indicator _____ From about 0.035 gram to about 0.075 gram.

The quantity of thickening agent used is similarly variable. In general, a quantity of thickening agent sufficient to provide a solution having a viscosity of 6 cps. to 14 cps., as determined at 26° C. using a Brookfield Viscometer, is employed. Where dextran is used, this objective will be achieved by employing up to about 6.0 grams of dextran for each 100 ml. of product. Furthermore, although it can be omitted from the formulation, up to 10.0 grams of sodium chloride per 100 ml. of solution can be used. The preferred products contain from about 3.0 grams to about 10.0 grams of sodium chloride for each 100 ml. of solution. A preferred composition contains, in each 100 ml. of distilled water solution, the named ingredients in the quantities indicated:

Nutrient or nutrient mixture _____ About 11 grams.
D-mannitol _____ About 15 grams.
Sodium chloride _____ About 5 grams.
Chemical indicator _____ About 0.55 gram.
Thickening agent _____ About 3.4 grams.

In the latter formulation, the preferred nutrient is a combination of 1 gram of beef extract and 10 grams of proteose peptone No. 3. Furthermore, in the preferred formulation, the chemical indicator is Phenol Red and the thickening agent is dextran having a molecular weight of from about 60,000 to about 90,000.

The diagnostic agent which is used in the practice of the present invention to detect coagulase production is a suitable coagulable material from which all, or substantially all, glucose has been removed. Such material includes, for example, dialyzed, lyophilized human plasma, dialyzed lyophilized rabbit plasma and fibrinogen. Preferably, a dialyzed, lyophilized plasmas is used. The manner in which the glucose is removed from the lyophilized plasma is not of critical importance. The glucose can be removed by any procedure which does not destroy the plasma and which does not interfere with its effective functioning in the diagnostic process. In one method, removal of glucose is accomplished by the dialysis of a suitable lyophilized plasma against a buffer of a pH of about 7.0 to about 7.8. After lyophilization, the plasma is stored at a temperature of about 40 C. in a sealed airtight container until used. In the dialysis procedure, a ratio of about 20 grams of lyophilized plasma is reconstituted to 100 ml. in distilled water. The reconstituted plasma is maintained at a temperature of about 4° C. to prevent bacterial growth. Each 100 ml. of reconstituted plasma is dialyzed against 10 liters of buffer to a pH of 7.0 to 7.8. In general, any suitable buffer system can be employed. In the preferred embodiment of the invention, the buffer which is used is prepared by dissolving a ratio of about 2.67 grams of monobasic potassium phosphate, about 11.34 grams of anhydrous dibasic sodium phosphate and about 8.75 grams of sodium chloride in about 9.5 liters of distilled water. Thereafter, the solution is brought to a volume of about 10 liters by the further addition of distilled water. The buffer solution, thus obtained, is kept at a temperature of about 4° C. and the dialysis is conducted at that temperature with continuous agitation of the buffer solution using an appropriate sized dialysis tubing. Under ordinary circumstances, the total dialysis consumes approximately 48 hours and during that time, the buffer solution should be changed two times, with at least two hours between two successive changes, Thus, in the over-all procedure, a total of about 30 liters of buffer solution is employed for each 100 ml. of reconstituted plasma in use. The dialyzed, lyophilized plasma, which is thus obtained, is free, or substantially free, of glucose. The dialyzed material is lyophilized once again and the product is stored, until used, at a temperature of about 4° C. Immediately prior to use, about 12.5 grams of the dialyzed, lyophiilzed product is added to about 50 ml. of sterile, distilled water.

As indicated heretofore, the diagnostic composition of this invention comprises a bibulous material which has been treated with a diagnostic agent which detects the fermentation of mannitol and with diagnostic agent which detects the production of coagulase. In one embodiment, the compositions of the invention are in the form of narrow strips of bibulous material each strip having six zones, as follows.

| 1 | 2 | 3 | 4 | 5 | 6 | with the zone denoted 1 being the coagulase production detecting zone containing the glucose-free, lyophilized plasma or fibrinogen component; with the zone denoted 2 being a hydrophobic barrier; with the zone denoted 3 being the mannitol fermentation detection zone containing mannitol and other substrates; with the zone denoted 4 being a second hydrophobic barrier; with the zone denoted 5 being untreated and with the zone denoted 6 being an identification band. Obviously, zones 5 and 6 can be omitted, if desired.

In preparing this product, zone 1 is first treated with an aqueous dextran solution and dried to provide a dextran coating thereon. The glucose-free coagulable material component is applied to zone 1, overlaying the dextran coating. It has been found that best results are achieved using a dextran solution having a viscosity of from about 13 to about 29 cps., as determined at 26° C. using a Brookfield Viscometer. Such a solution can be obtained by dissolving from about 16% to 25% by weight of dextran in distilled water.

The hydrophobic barriers serve to prevent the migration of one diagnostic agent to the other during the incubation period. The identity of the composition which is used as the hydrophobic barrier in the practice of this invention is not particularly critical. In general, any material which is microbiologically inert in the system and under the conditions described herein and which is capable of preventing leaching or migration of the components during the incubation, can be employed. Thus, for example, waxes, lacquers, naturally occurring hydrophobic materials such as, ethyl cellulose, and certain polymers are suitable for use. In the preferred embodiment of the invention, a colorless polymerized methyl acrylate coating composition, which is marketed commercially under the trade name Krylon 150 Crystal Clear by Krylon, Inc., Norristown, Pa., is employed. The aforementioned product is marketed in a toluene vehicle and, if desired or necessary, to facilitate its application to the bibulous material, it can be diluted with additional toluene or other hydrocarbon solvents, such as, methyl alcohol, ethyl alcohol, propyl alcohol, etc. Although variations are possible without departing from the scope of this invention, it has been found that a solution comprising from about 75% to about 100% v.v. of Krylon and about 0% to about 25% v.v. of added diluent provides a barrier solution which is well suited for use. A particularly preferred combination is a mixture of 85% v.v. of Krylon 150 Crystal Clear and 15% v.v. of ethyl alcohol U.S.P. Obviously, the untreated zone denoted 5 and the identification zone denoted 6 can be omitted, if desired.

The foregoing is a description of a preferred product of the invention, i.e. paper strips of bibulous material impregnated with the diagnostic agents as separate zones, the zones being separated by a hydrophobic barrier. In an alternate embodiment of the invention, the diagnostic agent which detects the fermentation of mannitol may be applied to the bibulous material and the diagnostic agent which detects the production of coagulase can be superimposed thereon to provide a strip having both diagnostic agents in a single first zone. In this embodiment of the invention, a hydrophobic barrier composition is applied immediately adjacent to the reagent zone as a second zone. A third zone, immediately adjacent to the second, is left untreated and a fourth zone, an identification band, is applied immediately adjacent to the untreated third zone. Obviously, the untreated third zone and the identification band can be omitted, if desired. The production of a product which contains the diagnostic reagents in separate zones and the production of a product which contains the diagnostic reagents in a single zone will be described in full detail in the examples which follow.

The diagnostic compositions of this invention have been found to be stable for a period of at least about six months when maintained at a temperature of about 37° C. To facilitate its packaging, and its use, the treated bibulous material, produced as described herein, is ordinarily cut into narrow strips which can be conveniently inserted into a suitable vial or test tube. Each cut strip, of course, contains the reagents required to detect the fermentation of mannitol and the production of coagulase. The strips, so packaged, can be easily shipped or stored without the danger of contamination.

Depending on the type of test strip used, i.e. a strip containing a single reagent zone or a strip containing the reagents in separate zones, and depending upon the media employed, there are certain differences in the manner in which the products are used in the differentiation of staphylococci. Thus, for example, where a single zone strip is used and non-selective media, i.e. inocula from neutral media, such as, blood agar, trypticase soy agar, etc. are employed, the procedure is as follows: a 3.0 mm. loopful of organisms from an 18 to 24 hour agar culture is suspended in 0.3 ml. of saline in an appropriate tube. The inoculum should be thoroughly mixed so that the suspension is uniform. Thereafter, the test strip is placed in the tube in such a manner that the reagent zone is immersed in the saline. The tube is then incubated in a water bath at a temperature of from about 35° C. to about 37° C., and, after about 45 minutes to 60 minutes incubation, the tube is examined for evidence of the coagulase reaction. A positive test is indicated by clumping of the bacterial suspension, the degree of clamping ranging from a fine precipitate to large clumps depending on the organism being tested. A negative test for coagulase production is indicated by the absence of clumping. After the tube has been examined for the coagulase reaction, it is placed again in the water bath and it is incubated at a temperature of 35° C. to 37° C. for an additional 3 to 5 hour period. Where Phenol Red is present as the chemical indicator in the mannitol fermentation detection agent, a positive mannitol fermentation test is indicated by the formation of a yellow color on the reagent band and in the saline suspension. A negative result is indicated by the formation of a pink to cherry red color on the reagent zone and in the saline suspension.

Where the test strip in use contains the agent for detecting the fermentation of mannitol and the agent for detecting the production of coagulase as separate and distinct zones, and where a non-selective media is employed, the differentiation of staphylococci is carried out in the following manner: a 3.0 mm. loopful of organisms from an 18 to 24 hour culture is suspended uniformly in 0.3 ml. of saline in a suitable tube. The test strip is added to the tube in such a manner that the coagulase production detecting reagent zone, i.e. the zone containing the specially prepared and standardized plasma or fibrinogen, is immersed in the suspension. Immediately thereafter, the tube is tipped so as to wet the mannitol fermentation detecting reagent zone. The tube is subsequently incubated at a temperature of about 37° C. in an incubator. The coagulase reaction can be read one hour after the start of incubation or at any time thereafter. A positive coagulase test is indicated by the formation of clumps which will range from a fine precipitate to large clumps. A negative coagulase reaction is indicated by the absence of clumping. After the examination of the tube for the coagulase reaction has been completed, the tube is placed once again in the incubator and maintained therein, at a temperature of about 37° C., for an additional 3 to 5 hour period. Where Phenol Red is present as the chemical indicator in the mannitol fermentation detection agent, a positive mannitol fermentation test is indicated by the formation of a yellow color on the mannitol reagent zone. A negative mannitol fermentation test is indicated by the formation of a pink to cherry red color on the mannitol reagent zone.

The procedure which is followed when the test strip in use contains the reagent for detecting the production of coagulase and the reagent for detecting the fermentation of mannitol as separate and distinct zones and where a selective media, i.e. and inocula from staphylococcal isolation media, such as, Mannitol Salt Agar, Chapman Stone Agar, etc. is employed, the procedure is as follows: a 3.0 mm. loopful of organisms from an 18 to 24 hour culture is suspended in 0.3 ml. of saline in a suitable tube. A loopful of organisms is rubbed into the mannitol reagent zone, following which the zone is moistened with a drop of saline. The test strip is then added to the tube in such a manner that the coagulase production detection reagent zone is immersed in the suspension. The tube is then incubated at a temperature of about 37° C., with the coagulase reaction being read one hour after the start of incubation or at any time thereafter. A positive coagulase test is indicated by the formation of clumps which will range in size from a fine precipitate to large clumps. A negative coagulase test is indicated by the absence of clumping. After the tube has been examined for the production of coagulase, it is placed once again in an incubator where it is maintained at a temperature of about 37° C. for an additional 3 to 5 hour period. Where Phenol Red is present in the mannitol fermentation detecting agent as the chemical indicator, a positive test for mannitol fermentation is indicated by the formation of a yellow color on the reagent zone, whereas a negative test for mannitol fermentation is indicated by the formation of a pink to cherry red color on the mannitol reagent zone.

The primary value of the diagnostic compositions of this invention in a clinical laboratory is the differentiation of pathogenic *S. aureus* from *S. epidermidis* which is frequently considered parasitic rather than pathogenic. The former produces coagulase and ferments mannitol while the latter neither produces coagulase nor ferments mannitol. The present invention provides a rapid, sensitive and reproducible method for making such a differentiation.

For a fuller understanding of the nature and objects of this invention, reference may be had to the following examples which are given merely as further illustrations of the invention and are not to be construed in a limiting sense.

EXAMPLE 1

(A) Preparation of reagent which detects the fermentation of mannitol

To a vessel containing 80 ml. of distilled water, there was added, in sequence, 1.0 gram of Bacto Beef Extract, 10.0 grams of Proteose Peptone No. 3, 15 grams of D-monnitol, 5 grams of sodium chloride and 0.55 gram of Phenol Red. Thereafter, 3.4 grams of dextran having a molecular weight of from about 60,000 to about 90,000 was added and the mixture was heated to a temperature of 100° C. to form a solution. The solution was then allowed to cool to room temperature, following which it was brought to a volume of 100 ml. by the addition of distilled water.

(B) Preparation of the reagent which detects the production of coagulase (a) 12.5 grams of lyophilized, dialyzed pooled human plasma, from which all detectable traces of glucose had been removed, was added to, and dissolved in, 50 ml. of sterile distilled water.

(b) The lyophilized, dialyzed pooled human plasma used in producing the solution described in the preceding paragraph was prepared in the following manner: 20.0 grams of lyophilized human plasma was dissolved in 80 ml. of distilled water and the solution was, thereafter, brought to a volume of 100 ml. by the addition of distilled water. Each 100 ml. of reconstituted plasma, thus obtained, was dialyzed against 10 liters of a buffer. The buffer used was prepared by dissolving, in sequence, 8.0 grams of monobasic potassium phosphate, 34.0 grams of anhydrous dibasic sodium phosphate, 26.5 grams of sodium chloride in 9.5 liters of distilled water. The solution was brought to a volume of 10 liters by the addition of distilled water. The buffer was maintained at a temperature of 4° C. and the plasma was dialyzed in one inch dialysis tubing. Dialysis was carried out at a temperature of 4° C. with continuous agitation of the buffer. Over the total dialysis time of approximately 48 hours, the buffer solution was changed two times, with at least 8 hours expiring between the changes. Since, at all times, 100 ml. of reconstituted plasma was dialyzed against 10 liters of buffer, a total of 30 liters of buffer was used in the process.

There was, thus obtained, a lyophilized, dialyzed plasma which was completely free of glucose.

(C) Preparation of hydrophobic barrier composition

This composition was prepared by diluting 85 ml. of Krylon 150 Crystal Clear with 15 ml. of ethyl alcohol, USP.

(D) Application of diagnostic reagents to bibulous material

A continuous sheet of Eaton-Dickeman Filter Paper #623 (70 pounds), measuring 82 mm. by 630 mm., was employed as the bibulous material in the production of 100 diagnostic paper strips measuring 82 mm. by 6.3 mm. The sheet was marked off into four zones as follows:

| 1 | 2 | 3 | 4 |
| --- | --- | --- | --- |
| 15 mm | 15 mm | 48 mm | 4 mm |

The hydrophobic barrier composition, the production of which is described in Section C of this example, was applied to Zone 2 in an amount sufficient to saturate the zone. The sheet was, thereafter, allowed to stand at room temperature to permit the solvent to evaporate.

When Zone 2 was completely dry, the reagent for detecting the fermentation of mannitol, i.e. the product of Section A of this example, was applied to Zone 1, care being taken to prevent Zone 1 from touching or overlapping Zone 2. Zone 1 was then allowed to dry.

The reagent for detecting the production of coagulase, i.e. the composition described in Section B of this example, was applied to Zone 1 on top of the dried mannitol fermentation detecting reagent. Zone 1 was, thereafter, dried once again, following which an additional quantity of the Section B composition was reapplied. Zone 3 was untreated and Zone 4 is an identification band. After drying, the paper was cut into 100 strips, each measuring 82 mm. by 6.3 mm., each strip containing the four zones described heretofore.

(E) Use of diagnostic composition

In using the diagnostic composition produced as described in Section D of this example, a full 3 mm. loop of organisms from trypticase soy broth or blood agar plate is suspended in 0.3 ml. of saline in a 13 x 100 mm. tube. A test strip, produced as described in Section D of this example, is added to the tube in such a manner that the media zone is immersed in the suspension. The tube is, thereafter, incubated in a water bath at a temperature of 37° C. At the end of an incubation period of one hour, the tube is examined for evidence of the coagulase reaction. A positive coagulase test is indicated by a clumping of the bacterial suspension ranging from a fine precipitate to large clumps. In a negative coagulase test, the suspension remains homogeneous. Incubation of the tube is continued and at the end of a total incubation period of six hours, the tube was examined once again, this time for evidence of mannitol fermentation. A positive mannitol fermentation test is indicated by the development of a yellow color on the medium zone, i.e. Zone 1, and in the suspension. A negative test is indicated by the development of a yellow color on the medium zone, i.e. Zone 1, and in the suspension. A negative test is indicated by the development of a pink to cherry red color on the medium zone and in the suspension.

(F) Alternate embodiment of the invention

This example was repeated in its entirety except that the lyophilized, dialyzed pooled human plasma employed therein was replaced by 12.5 grams of glucose-free lyophilized, dialyzed pooled rabbit plasma.

The product, thus obtained, i.e. the test strip, was found to be entirely satisfactory for the rapid and reliable detection of coagulase production and mannitol fermentation in staphylococci.

EXAMPLE 2

This example describes the production of bibulous test strips to which the reagent for detecting coagulase production and the reagent for detecting mannitol fermentation have been applied as separate zones.

(A) Preparation of reagent which detects the fermentation of mannitol (B) Preparation of reagent which detects the production of coagulase (C) Preparation of hydrophobic barrier composition The reagents (A) and (B) and the composition (C) were produced, using the same components and the same quantities thereof, by the methods described in Sections (A), (B) and (C), respectively, of Example 1.

(D) Application of diagnostic reagents to bibulous material

In producing the strips, a continuous sheet of Eaton Dikeman Filter Paper #623 (70 pounds), 82 mm. in width, was employed. The paper was divided into 6 separate zones as follows:

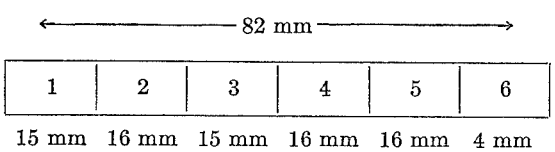

The hydrophobic barrier composition, produced as described in Section C of Example 1, was applied to Zones 2 and 4. These zones were allowed to dry and, when dry, Zone 1 was treated with a solution of dextran (molecular weight 60,000 to 90,000) in distilled water, the solution used containing 18.3 grams of dextran per 100 ml. of solution. Care was taken that Zones 1 and 2 did not touch or overlap. When Zone 1 was dry, there was applied thereto, over the dextran coating, the lyophilized, dialyzed plasma composition, produced as described in Section B of Example 1. Overlapping of Zones 1 and 2 was avoided. When Zone 1 was dry, the composition for detecting mannitol fermentation was applied to Zone 3, following which the zone was dried. Zone 6 was treated, strictly for identification purposes, with a distilled water solution, each 100 ml. of which contained 0.1 gram of F.D. & C. Blue No. 1 and 0.4 gram of F.D. & C. Yellow No. 6. The paper, thus treated, was cut into strips of ¼" width, each strip containing the six zones herein described.

(E) Use of diagnostic composition

The test strips, the production of which is described in this example, have certain advantages over the test strips produced as described in Example 1. Since the coagulase production detection reagent and the mannitol fermentation detecting agent are applied as two separate zones, it is possible to conduct the test using either an inoculum from neutral media, e.g. blood agar, trypticase soy agar, etc. or using an inoculum from staphylococcal isolation media, e.g. Mannitol Salt Agar, Chapman Stone Agar, etc. Accordingly, a description of the method carried out using both types of media, follows hereinafter.

In the procedure utilizing an inoculum from neutral media, a 3.0 mm. loopful of organisms was suspended in 0.3 ml. of saline in a test tube. The test strip, the production of which is described in Section D of this example, is immersed in the suspension in such a manner that Zone 1 is in contact with the suspension. Immediately thereafter, the tube is tipped to an angle so that the suspension contacts and wets Zone 3. The tube is then incubated at a temperature of 37° C. The coagulase reaction is read after an incubation period of one hour or later. A positive coagulase test is indicated by a clumping of the bacterial suspension in the tube. Clumping will vary from a fine precipitate to large clumps. A negative coagulase reaction is indicated by the absence of clumping. Incubation is continued beyond the coagulase production determination, for a period of time up to an additional five hours, i.e. a total incubation period of six hours. In the determination of mannitol fermentation, the reaction may be prompt or it may be delayed, depending on the biochemical characteristics of a given isolate. A positive mannitol test is indicated by the formation of a yellow color on Zone 3 of the strip. A negative reaction is indicated by the formation of a pink to cherry red color on Zone 3 of the strip. A negative mannitol fermentation should not be read until the full six hours incubation time has elapsed.

Where an inoculum from staphylococcal isolation media is used, e.g. Mannitol Salt Agar, Chapman Stone Agar, etc., a 3.0 mm. loopful of organisms is suspended in 0.3 ml. of saline in a test tube. A loopful of organisms is rubbed into the mannitol fermentation zone of the test strip, i.e. Zone 3, and the zone is moistened with one drop of saline. The test strip is then added to the suspension in such a manner that Zone 1 is immersed therein. The tube is subsequently incubated at a temperature of 37° C. and the coagulase reaction can be read one hour or later following the start of incubation. A positive coagulase test is indicated by the formation of clumps while a negative coagulase reaction is indicated by the absence of clumping. Incubation is continued for an additional five hours to bring the total incubation period to six hours. A positive mannitol fermentation is indicated by the formation of a yellow color on Zone 3 of the test strip while the negative result is indicated by the formation of a pink to cherry red color on Zone 3 of the test strip.

(F) Alternate embodiment of the invention

This example was repeated in its entirety except that 1.0 gram of fibrinogen was used, in lieu of 12.5 grams of the lyophilized, dialyzed pooled human plasma, as the reagent for detecting the production of coagulase.

The product, thus obtained, i.e. the test strip, was found to be entirely satisfactory for the rapid and reliable detection of coagulase production and mannitol fermentation in staphylococci.

What we claim is:

1. A diagnostic reagent for the rapid and positive identification of staphylococci which comprises a bibulous material containing
    (i) a composition comprising
        (a) a nutrient capable of supporting the growth of microorganisms
        (b) D-mannitol, and
        (c) a chemical indicator which produces a color change in the presence of acid degradation products which are formed by the fermentation of mannitol, and
    (ii) a coagulase coagulable material from which all, or substantially all, glucose has been removed,
said composition (ii) overlaying said composition (i).

2. A diagnostic reagent for the rapid and positive identification of staphylococci which comprises a bibulous material impregnated with
    (i) a composition comprising
        (a) a nutrient capable of supporting the growth of microorganisms
        (b) D-mannitol, and
        (c) a chemical indicator which produces a color change in the presence of acid degradation products which are formed by the fermentation of mannitol
and
    (ii) a coagulase coagulable material from which all, or substantially all, glucose has been removed,
said compositions (i) and (ii) being applied separately to the bibulous material so as to form two reagent zones, said reagent zone (i) being separated from reagent zone (ii) by a hydrophobic barrier zone.

3. The diagnostic reagent of claim 1 wherein composition (i) contains also sodium chloride.

4. The diagnostic reagent of claim 1 wherein composition (i) contains also a thickening agent.

5. The diagnostic reagent of claim 1 wherein, in composition (i), ingredient (a) is a mixture of Beef Extract and Proteose Peptone and ingredient (c) is Phenol Red.

6. The diagnostic reagent of claim 2 wherein composition (ii) is applied to a zone on the bibulous material which is coated with dextran.

7. The diagnostic reagent of claim 2 wherein composition (i) contains also sodium chloride.

8. The diagnostic reagent of claim 2 wherein composition (i) contains also a thickening agent.

9. The diagnostic reagent of claim 2 wherein composition (i), ingredient (a) is a mixture of Beef Extract and Proteose Peptone and ingredient (c) is Phenol Red.

10. The diagnostic reagent of claim 2 wherein the hydrophobic barrier zone comprises a polymerized methyl acrylate coating composition.

11. The composition of claim 4 wherein the thickening agent is dextran.

12. The composition of claim 8 wherein the thickening agent is dextran.

13. The diagnostic reagent of claim 2 wherein the coagulase coagulable material is selected from the group consisting of lyophilized human plasma, lyophilized rabbit plasma and fibrinogen, said material being free, or substantially free, of glucose.

14. A process for the differentiation of staphylococci which comprises immersing the diagnostic reagent of claim 1 in a saline suspension of an inoculum from neutral media, incubating the suspension for a period of about one hour at a temperature of from about 35° C. to about 37° C., examining the suspension for the formation of clumps, and further incubating the suspension for an additional period of from about three to about five hours at a temperature of 37° C. and examining the reagent zone and the suspension for a color change.

15. A process for the differentiation of staphylococci which comprises adding the diagnostic reagent of claim 2 to a saline suspension of an inoculum from neutral media in such a manner that only the reagent zone containing composition (ii) is immersed in the suspension, subsequently wetting the reagent zone containing composition (i) with said suspension, incubating the suspension for a period of about one hour at a temperature of about 37° C., examining the suspension for the formation of clumps, and further incubating the suspension for an additional period of from about threee to about five hours at a temperature of about 37° C. and examining the reagent zone which contains composition (i) for a color change.

16. A process for the differentiation of staphylococci which comprises applying an inoculum from staphylococcal isolation media to the reagent zone of the diagnostic reagent of claim 2 containing composition (i), subsequently moistening said reagent zone with saline, thereafter adding the diagnostic reagent to a saline suspension of an inoculum from staphylococcal isolation media in such a manner that the reagent zone containing composition (ii) is immersed in said suspension, incubating the suspension for a period of about one hour at a temperature of about 37° C., examining the reagent for the formation of clumps, further incubating the suspension for an additional period of from about 3 to about 5 hours at a temperature of about 37° C. and examining the reagent zone which contains composition (i) for a color change.

References Cited

UNITED STATES PATENTS 3,359,180   12/1967   Evans et al. _____ 195—103.5

OTHER REFERENCES

"Chemical Abstracts," 47:662a.

Esber et al., "Am. J. Clin. Path.," 32(2):192–194 (August 1959).

A. LOUIS MONACELL, Primary Examiner

M. D. HENSLEY, Assistant Examiner

U.S. Cl. X.R.

195—100